United States Patent [19]

Segawa et al.

[11] Patent Number: 4,633,271
[45] Date of Patent: Dec. 30, 1986

[54] OPTICAL WRITING DEVICE

[75] Inventors: Hideo Segawa, Tokyo; Toshiyuki Inokuchi; Takashi Shibaguchi, both of Yokohama; Fumio Asano, Itabashi, all of Japan

[73] Assignee: Ricoh Company, Ltd., Japan

[21] Appl. No.: 530,231

[22] Filed: Sep. 8, 1983
(Under 37 CFR 1.47)

[30] Foreign Application Priority Data

Sep. 9, 1982 [JP] Japan .................. 57-157284

[51] Int. Cl.$^4$ .............................................. G01D 9/42
[52] U.S. Cl. .............................................. 346/107 R
[58] Field of Search ............... 346/107 R, 108, 160; 428/917; 361/414

[56] References Cited

U.S. PATENT DOCUMENTS

| | | | |
|---|---|---|---|
| 3,173,745 | 3/1965 | Stone | 346/107 R |
| 3,233,247 | 2/1966 | Rychlewski | 346/107 R |
| 3,980,888 | 9/1976 | Guddem | 428/917 |
| 4,371,744 | 2/1983 | Badet | 361/414 |
| 4,458,989 | 7/1984 | Tschang | 346/160 |

Primary Examiner—E. A. Goldberg
Assistant Examiner—Mark Reinhart
Attorney, Agent, or Firm—Guy W. Shoup

[57] ABSTRACT

An optical writing device includes a substrate, an array of pixel electrodes, each of which is provided with a luminescent material, a filament electrode disposed in parallel with the array, an enclosure member for enclosing the pixel and filament electrodes and the array, and driver I.C. chips mounted on the substrate. Such a structure may be made extremely compact in size with low cost.

10 Claims, 7 Drawing Figures

OPTICAL WRITING DEVICE

BACKGROUND OF THE INVENTION

1. Field of the Invention

This application has been filed under 37 CFR 1.47(a) which status continues.

This invention relates to a device for converting an electrical image signal into a light image signal to be applied to an imaging surface, and, in particular, to an optical writing device including an array of light emitting elements for optically writing an image on an imaging surface on the basis of an electrical image signal.

2. Description of the Prior Art

Various optical writing devices are known in the art. Typically, an optical writing device is used in a recording machine such as a printer, copier and facsimile machine. Some optical writing devices use a laser or optical fiber tubes, in which a light beam or dot is scanned along a horizontal line sector in forming an image on an imaging surface. In this case, however, the optical writing device tends to be bulky. Some optical writing devices use an array of light emitting diodes or liquid crystal elements, in which a plurality of light emitting elements are arranged in the form of an array and they are selectively activated in accordance with an electrical image signal supplied thereto. Such optical writing devices are relatively smaller in size as compared with the former type, but they tend to be complicated in structure and expensive to make.

SUMMARY OF THE INVENTION

In accordance with the present invention, there is provided an optical writing device which comprises a substrate, a plurality of first electrodes arranged in the form of an array on the substrate, each of the first electrode being provided with a light emitting element, a second electrode disposed opposite to the array of first electrode, an enclosure member for completely enclosing the array of first electrodes and the second electrode, and a driving and controlling circuitry mounted on the substrate.

In one embodiment, the plurality of first electrodes define minute electrodes of positive polarity which are arranged in a straight line or in a staggered fashion. The light emitting element provided on each of the first electrodes is preferably comprised of a luminescent material. The second electrode is preferably comprised of a filament which defines an opposite electrode of negative polarity and which emits electrons when heated, for example, as passing electrical current therethrough. The enclosure member is preferably of the type which defines a vacuum chamber in which the first and second electrodes are disposed, and the enclosure member includes a transparent portion which defines a window through which emitted light may be lead to an imaging surface. A plurality of leads, one for each of the first electrodes, are provided on the substrate extending beyond the enclosure member thereby allowing to establish electrical connection between the first electrodes and the driving and controlling circuitry, which is typically comprised of an appropriate number of I.C. chips.

With such a structure, when the filament electrode is heated by receiving current, electrons are liberated from the filament and emitted into the vacuum space defined by the enclosure member. Under the condition, the second electrodes are selectively activated in accordance with an image signal supplied to the driving and controlling circuitry, and thus a positive driving voltage is applied to the second electrodes whenever selected. As a result, the electrons emitted into the vacuum chamber are accelerated to the selected ones of second electrodes so that they bombard the luminescent light emitting element on each of the selected second electrodes, whereby the luminescent element absorbs the energy of the bombarding electrons to emit luminescent light. The luminescent light thus emitted passes through the transparent portion of the enclosure member and, after passing through an appropriate optical system, it is focused onto an imaging surface such as a photosensitive member which is charged uniformly previously.

In such an optical writing device, it is normally required to provide a large number of light emitting elements as arranged in the form of an array in order to attain a satisfactory resolution. A typical array density ranges from 8 to 16 elements or dots/mm. A large number of light emitting elements indicate the presence of a large number of second electrodes, which, in turn, requires the provision of an equally large number of leads individually connected to the second electrodes. In the structure of one embodiment of the present invention, use is made of an appropriate number of I.C. chips as integrally mounted on the same substrate as the one on which the array of light emitting elements is formed. Such a structure allows to make the whole device compact in size and inexpensive to manufacture.

It is therefore a primary object of the present invention to provide an optical writing device which is compact in size, simple in structure and thus inexpensive to make.

Another object of the present invention is to provide an optical writing device including a plurality of light emitting elements comprised of a luminescent material and arranged in the form of an array.

A further object of the present invention is to provide an optical writing device including an integrated driving and controlling circuitry as mounted on the same substrate on which is also provided an array of light emitting elements.

Other objects, advantages and novel features of the present invention will become apparent from the following detailed description of the invention when considered in conjunction with the accompanying drawings.

DESCRIPTION OF THE PREFERRED EMBODIMENTS

Figure 1:
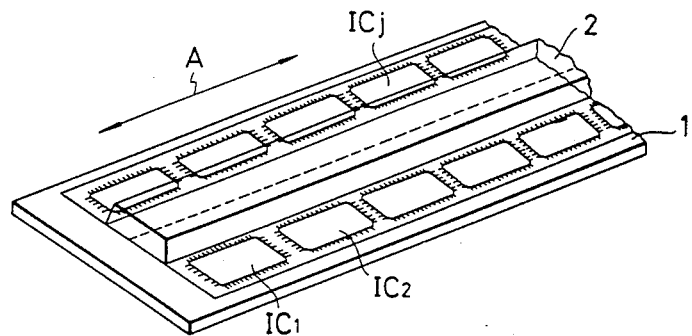
FIG. 1 is a partial, perspective view showing the optical writing device constructed in accordance with one embodiment of the present invention.

Referring now to FIG. 1, there is shown the optical writing device constructed in accordance with one embodiment of the present invention. It is to be noted that the optical writing device is generally elongated in one direction, i.e., direction A as indicated in FIG. 1, but only a part thereof is shown in FIG. 1. As shown, the optical writing device of FIG. 1 comprises a rectangularly shaped substrate 1 which also serves as a support plate on which various components are mounted. An enclosure member 2 generally in the form of a trough is fixedly and sealingly mounted upside down on the susbtrate 1 thereby defining a vacuum chamber. As will be described fully later, the enclosure member 2 is so located that an array of light emitting elements provided on the substrate 1 is in the vacuum chamber. The enclosure member 2 is transparent at least partly so as to allow light emitted from the array of light emitting elements to pass through the enclosure member 2 to be lead outside. A plurality of I.C. chips $IC_1, \ldots IC_j, \ldots$ are also mounted on the substrate 1 as arranged on both sides of the elongated enclosure member 2.

Figure 2:
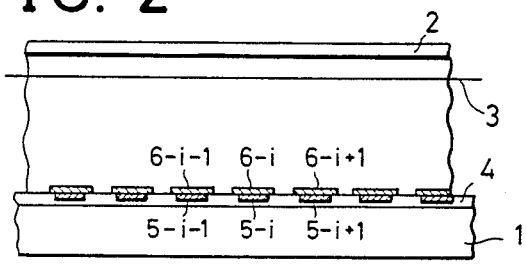
FIG. 2 is a partial, cross-sectional view showing somewhat on an enlarged scale the transverse cross sectional structure of the device of FIG. 1.

As shown in FIG. 2, an insulating layer 4 is provided on top of the substrate 1. Naturally, in the case where the substrate 1 itself is comprised of an electrically insulating material, the insulating cover layer 4 may be discarded, if desired. However, such a two layer structure is preferable because of an increased choice of material for the substrate 1. As best shown in FIG. 2, an air-tight chamber is defined between the substrate 1 and the enclosure member 2, preferably of glass. It is preferable to evacuate the thus formed chamber thereby making it to be a vacuum chamber. A plurality of pixel electrodes 5 are provided on the insulating layer 4 as arranged in the form of an array. The pixel electrodes 5 may be provided as partly embedded in the insulating layer 4. On each of the pixel electrodes 5 is provided a light emitting element 6, which is comprised of a luminescent material. Any luminescent material known to those skilled in the art may be used in the present invention as long as it emits light as absorbing energy from electrons impinging thereon. Thus, there is provided an equal plurality of light emitting elements forming an array. Of importance, the pixel electrodes 5 and thus the light emitting elements 6 are all disposed inside of the vacuum chamber. A filament electrode 3 is also disposed in the vacuum chamber as extending in the longitudinal direction of the device or in parallel with the rectilinear array of light emitting elements 6. The filament electrode 3 defines a counter electrode against the pixel electrodes 5 so that the filament electrode 3 serves as a source of hot electrons and the pixel electrodes 5 and thus the luminescent elements 6 thereon serve as sinks of hot electrons. It is to be noted that two or more filament electrodes may be provided, if necessary.

Figure 3:
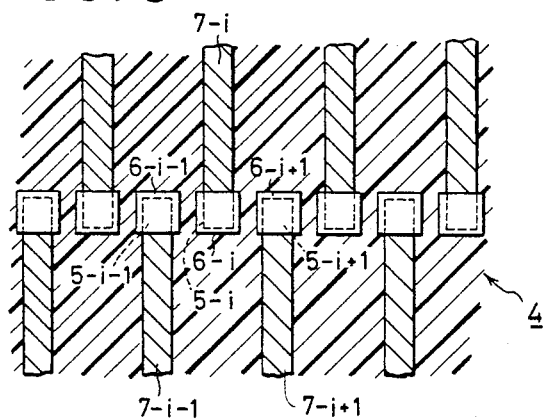
FIG. 3 is a schematic illustration showing the arrangement of light emitting elements and the leads extending therefrom perpendicularly as provided in the device of FIG. 1.

As shown in FIG. 3, the pixel electrodes 5 and thus the luminescent elements 6 individually provided thereon are arranged in a line as spaced apart from each other at a predetermined pitch. Leads 7 extend from respective pixel electrodes 5 in the direction normal to the array of the luminescent elements 6. In the embodiment shown in FIG. 3, the leads 7 extend opposite in direction alternately; however, they may extend all in the same direction, if desired. However, the alternate arrangement shown in FIG. 3 is preferred especially when a high resolution and thus a high density array must be prepared. The pixel electrodes 5 and leads 7 are preferably formed by the application of thin-film technology. Although not shown specifically, the leads 7 are preferably so structured to be separated from each other farther away as they extend more away from the array of pixel electrodes 5 thereby easing connection to the bonding pads of I.C. chips $IC_j$. As also shown in FIG. 3, the leads 7 are preferably embedded in the insulating layer 4 except contact portions which need to be exposed. In FIG. 3, the luminescent elements 6 are in the shape of a square; however, they may take any shape, as desired.

As described previously, driver I.C. chips $IC_j$ are mounted on the substrate 1 on both sides of the enclosure member 2. Any well-known bonding method may be used such as tape carrier bonding and flip-chip bonding in mounting the I.C. chips $IC_j$ on the substrate 1. As briefly mentioned before, an interconnection pattern is defined by the far end portions of the leads 7 on that portion of the substrate 1 adjacent to and exteriorly of the enclosure member 2. I.C. chips $IC_j$ are suitably bonded to the substrate 1 at this interconnection region. These driver I.C.s $IC_j$ must have a function to activate the pixel electrodes 5 individually and selectively in accordance with an electrical image signal supplied thereto from an image signal source (not shown). Since such an image signal is normally a serial signal, each of the driver I.C.s should include a serial-in-parallel-out shift register, preferably of 32 or 64 bits. The I.C.s each should include a latch functioning as a data buffer and having the same number of bits as that of the shift register and a plurality of switching transistors, each connected to the associated bit of the latch. The on/off conditions of the switching transistors determine whether the associated pixel electrodes 5 are to be activated. Thus, when the pixel electrodes 5 are activated because the associated switching transistors are turned on, a predetermined driving voltage is applied to the activated pixel electrodes.

Figure 4:
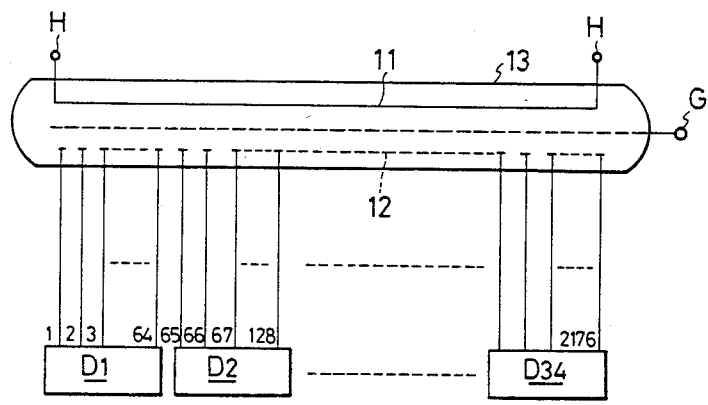
FIG. 4 is a schematic illustration showing one form of the connection between the array of second electrodes and I.C. chips in the present optical writing device for selectively activating the second electrodes in accordance with an image signal supplied thereto.

FIG. 4 schematically illustrates one form of the electrical connection between pixel electrodes 12 provided as spaced apart from each other in the form of an array in a vacuum container 13 as opposed to a filament electrode 11 which is also provided in the vacuum container 13. Also provided as interposed between the filament electrode 11 and the array of pixel electrodes 12 is a grid electrode G. Both ends of the filament electrode 11 are connected to heater terminals H. In this embodiment, the number of pixel electrodes 12 provided is 2,176. And, there are provided 34 64-bit driver I.C. chips D1–D34. It should be understood that these driver I.C. chips D1–D34 are integrally mounted on the same substrate as the one on which the vacuum container 13 is mounted as described with respect to the structure shown in FIGS. 1 through 3. Although not shown specifically, the driver I.C. chips D1–D34 are so connected to an external circuit to receive an image signal and each bit of the individual I.C. chips D1–D34 is uniquely connected to the associated pixel electrode 12.

Figure 5:
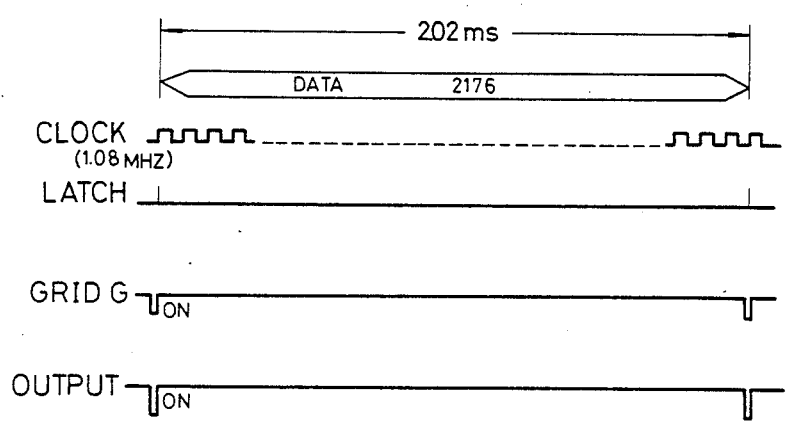
FIG. 5 is a timing chart which is useful for understanding the operation of the structure shown in FIG. 4.

The operation of the structure shown in FIG. 4 will manifest itself when reference is made to the timing chart shown in FIG. 5. Here, it is assumed that recording density or resolution is 10 dots/mm and recording speed is 2.02 ms/line ( i.e., 49.5 mm/sec ).

Figure 6:
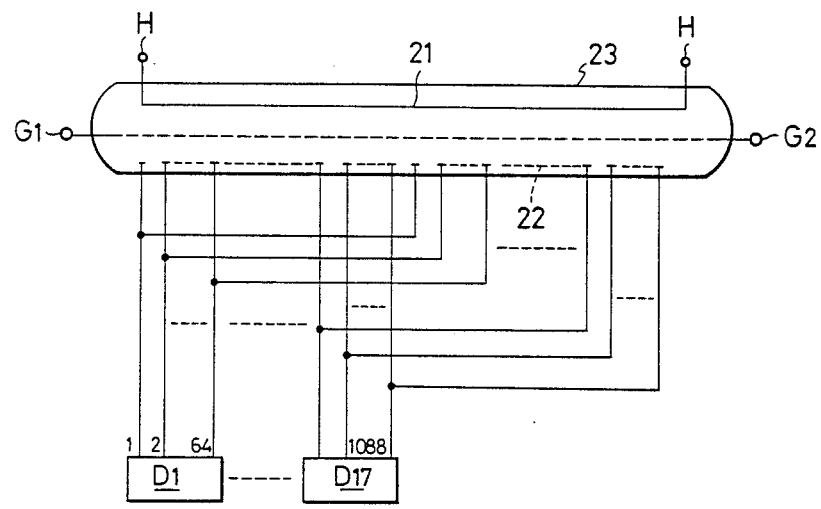
FIG. 6 is a schematic illustration showing another form of the connection between the array of second electrodes and I.C. chips in the present optical writing device.
Figure 7:
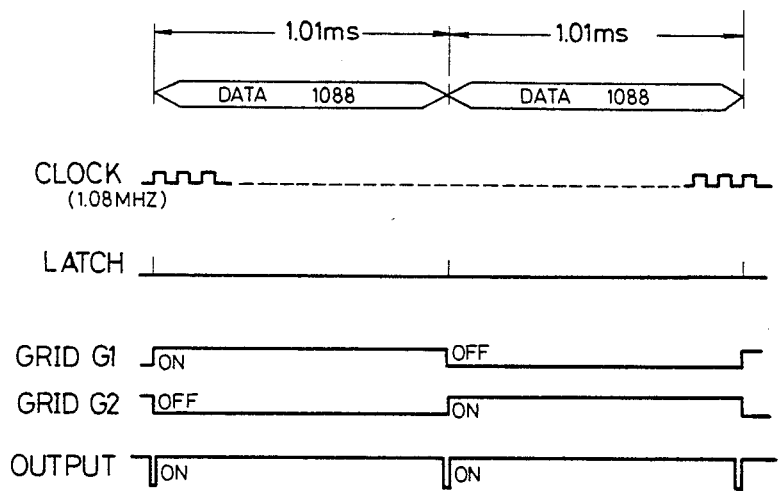
FIG. 7 is a timing chart which is useful for understanding the operation of the structure shown in FIG. 6.

FIG. 6 schematically shows an alternative form of connection between pixel electrodes 22 and drive I.C. chips D1–D17. The structure shown in FIG. 6 is similar in many respects to the structure shoWn in FIG. 4; for example, the elements 21, 22 and 23 shown in FIG. 6 correspond to the elements 11, 12 and 13, respectively, shown in FIG. 4. In the structure of FIG. 6, the number of driver I.C. chips provided is half of that in the structure of FIG. 4, and, thus, each bit of the I.C. chips D1–D17 is commonly connected to predetermined two, i.e. one in the left half and one in the right half in the present embodiment, of the pixel electrodes 22. In this connection, there is provided a pair of grid electrodes G1 and G2, which are activated alternately as shown in FIG. 7. With such alternate activation of the pair of grid electrodes G1 and G2, activation of unwanted pixel electrodes 22 due to common connection may be prevented from occurring.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optically writing device comprising:
   a substrate;
   a plurality of first electrodes provided on said substrate as arranged in the form of an array;
   a like plurality of light emitting elements each mounted on said plurality of first electrodes, each of said light emitting elements being capable of emitting light by absorbing energy from electrons impinging thereon;
   a second electrode for emitting electrons disposed spaced apart and not making physical contact with, a predetermined distance away from said substrate and extending generally in parallel with the array of said plurality of first electrode;
   means for enclosing at least said plurality of light emitting elements and said second electrode; and
   means mounted on said substrate for driving said plurality of first electrodes selectively in accordance with an image signal supplied thereto.

2. A device of claim 1 wherein said plurality of light emitting elements are each comprised of a luminescent material.

3. A device of claim 2 wherein said means for enclosing includes an enclosure member generally in the shape of a trough, said trough-shaped enclosure member being turned upside down and sealingly and fixedly attached to said substrate thereby defining a sealed chamber in which said plurality of first electrodes, said light emitting elements and said second electrode are located.

4. A device of claim 3 wherein said, enclosure member includes a transparent portion at least partly thereby defining a window to allow passage of light therethrough.

5. A device of claim 3 wherein said sealed chamber is evacuated to a vacuum state.

6. A device of claim 1 further comprising an insulating layer formed on said substrate, and said plurality of first electrodes are defined on said insulating layer.

7. A device of claim 6 wherein said means for driving includes a plurality of leads individually extending from said plurality of first electrodes embedded in said insulating layer at least partly.

8. A device of claim 1 wherein said means for driving includes an appropriate number of driver I.C. chips as mounted on said substrate.

9. A device of claim 1 wherein said second electrode is in the form of a filament.

10. A device of claim 9 further comprising a grid electrode interposed between said substrate and said second electrode and extending generally in parallel with said substrate and said second electrode.

* * * * *